(12) United States Patent
Iguchi

(10) Patent No.: US 9,904,342 B2
(45) Date of Patent: Feb. 27, 2018

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Junji Iguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/339,332

(22) Filed: Jul. 23, 2014

(65) Prior Publication Data

US 2016/0026228 A1 Jan. 28, 2016

(30) Foreign Application Priority Data

Aug. 5, 2013 (JP) ................................. 2013-162802

(51) Int. Cl.
G06F 1/26 (2006.01)
G05F 1/625 (2006.01)
G06F 1/32 (2006.01)
G06F 1/28 (2006.01)

(52) U.S. Cl.
CPC .............. *G06F 1/266* (2013.01); *G05F 1/625* (2013.01); *G06F 1/3206* (2013.01); *G06F 1/3287* (2013.01); *G06F 1/28* (2013.01); *G06F 1/3284* (2013.01)

(58) Field of Classification Search
CPC ........ G06F 1/3287; G06F 1/3206; G06F 1/28; G06F 1/266; G06F 1/3284; G05F 1/625
USPC ........................... 713/323, 324, 340; 347/167
See application file for complete search history.

(56) References Cited

U.S. PATENT DOCUMENTS

| 6,389,544 | B1 | 5/2002 | Katagiri |
| 6,442,702 | B1 | 8/2002 | Ishikawa et al. |
| 6,968,207 | B1 | 11/2005 | Ezumi et al. |
| 8,867,047 | B2 | 10/2014 | Hotogi et al. |
| 2010/0237913 | A1 | 9/2010 | Nishioka |
| 2012/0080947 | A1* | 4/2012 | Karino ...................... H02J 1/14 307/31 |

(Continued)

FOREIGN PATENT DOCUMENTS

CN 102957198 A 3/2013
CN 103001496 A 3/2013

(Continued)

OTHER PUBLICATIONS

Office Action dated Jun. 2, 2017, in Japanese Patent Application No. 2013-162802.

(Continued)

*Primary Examiner* — Ji H Bae
(74) *Attorney, Agent, or Firm* — Fitzpatrick, Cella, Harper & Scinto

(57) ABSTRACT

An image forming apparatus comprises a first circuit unit including a control unit and a second circuit unit having a driving unit. The apparatus generates, by a power-supply unit, a power-supply voltage necessary for driving the driving unit to supply the power-supply voltage to the driving unit. The apparatus detects a voltage reduction of the power-supply voltage and performs access stopping processing for stopping access of the second circuit unit, based on the detecting of the voltage reduction of the power-supply voltage.

10 Claims, 8 Drawing Sheets

(56) References Cited

U.S. PATENT DOCUMENTS

| 2012/0154870 A1* | 6/2012 | Ogushi | G06K 15/402 |
| | | | 358/1.16 |
| 2015/0002885 A1* | 1/2015 | Takahashi | G03G 15/5004 |
| | | | 358/1.14 |
| 2015/0190560 A1* | 7/2015 | Aalders | A61M 1/06 |
| | | | 604/514 |

FOREIGN PATENT DOCUMENTS

| JP | 2000-056868 A | 2/2000 |
| JP | 2000-228829 A | 8/2000 |
| JP | 2002-268473 A | 9/2002 |
| JP | 2003-054097 A | 2/2003 |
| JP | 4293568 B2 | 7/2009 |
| JP | 2009-292095 A | 12/2009 |
| JP | 2010-218406 A | 9/2010 |
| JP | 2012-008407 A | 1/2012 |
| WO | 2012/169560 A1 | 12/2012 |

OTHER PUBLICATIONS

Office Action dated Feb. 3, 2017, in Chinese Patent Application No. 201410373219.6.

* cited by examiner

IMAGE FORMING APPARATUS, METHOD OF CONTROLLING THE SAME, AND STORAGE MEDIUM

BACKGROUND OF THE INVENTION

Field of the Invention

The present invention relates to an image forming apparatus, a method of controlling the same and a storage medium.

Description of the Related Art

Because the time period that an image forming apparatus is in a standby state is very much longer than an operation time period, demand for power conservation when the image forming apparatus is in the standby state has been growing. In response to this kind of demand, a power conservation mode for waiting with less electric power consumption than the electric power consumption upon standby of a normal mode has been realized in conventional image forming apparatuses. In a power conservation mode, a power-supply to portions other than a control unit, such as a printer unit, a reading unit, or the like, for which the power-supply is unnecessary in standby is stopped. Furthermore, in order to reduce electric power consumption, for example, Japanese Patent Laid-Open No. 2002-268473 proposes a technique for dividing a power-supply circuit of a device into a plurality of power-supply circuits, and controlling power-supply to each electric circuit from each of the power-supply circuits.

However, in the above described conventional technique, in the control module for controlling the power-supply, the generation of a high-power-supply voltage such as 38V, or 24V is stopped when an operation of a scanner, or the like, is completed, and when a copy operation is instructed, instruction is made to each power-supply circuit so as to generate the high-power-supply voltage. Here, after the control module instructs so as to generate the high-power-supply voltage, or to stop, transition is made into control of a motor, or the like, but a time difference occurs between the time when the high-power-supply voltage is generated or stopped and further circuit control voltage is generated from that high-power-supply voltage, and the operation of the electric circuit that is supplied with power. For this reason, there were cases where the control module outputs a signal for driving the circuit of the drive unit even in a case where after generation of high-power-supply voltage is instructed, voltage of the drive unit is not generated yet and it so cannot operate, and there was the problem that integrity was decreased.

SUMMARY OF THE INVENTION

An aspect of the present invention is to eliminate the above-mentioned problems with the conventional techniques.

A feature of the present invention is to provide a technique in which it is identified accurately whether a power-supply voltage supplied to a second circuit unit including a mechanism driven by a control module is reduced or is normal, and in which each unit operating by the power-supply voltage being supplied is controlled adequately.

According to an aspect of the present invention, there is provided an image forming apparatus comprising a first circuit unit including a control unit, a second circuit unit having a driving unit, a power-supply unit configured to supply a power-supply voltage necessary for the driving unit, and a detection unit configured to detect a voltage reduction of the power-supply voltage, wherein the control unit is configured to perform access stopping processing for stopping access of the second circuit unit, based on the detection unit detecting the voltage reduction of the power-supply voltage.

According to another aspect of the present invention there is provided a method of controlling an image forming apparatus comprising a first circuit unit including a control unit and a second circuit unit having a driving unit, the method comprising supplying, from a power-supply unit, a power-supply voltage necessary for driving the driving unit, and detecting a voltage reduction of the power-supply voltage, wherein the control unit performs access stopping processing for stopping access of the second circuit unit, based on the detecting of the voltage reduction of the power-supply voltage.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of a power conservation mode of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention.

First Embodiment

Figure 1:
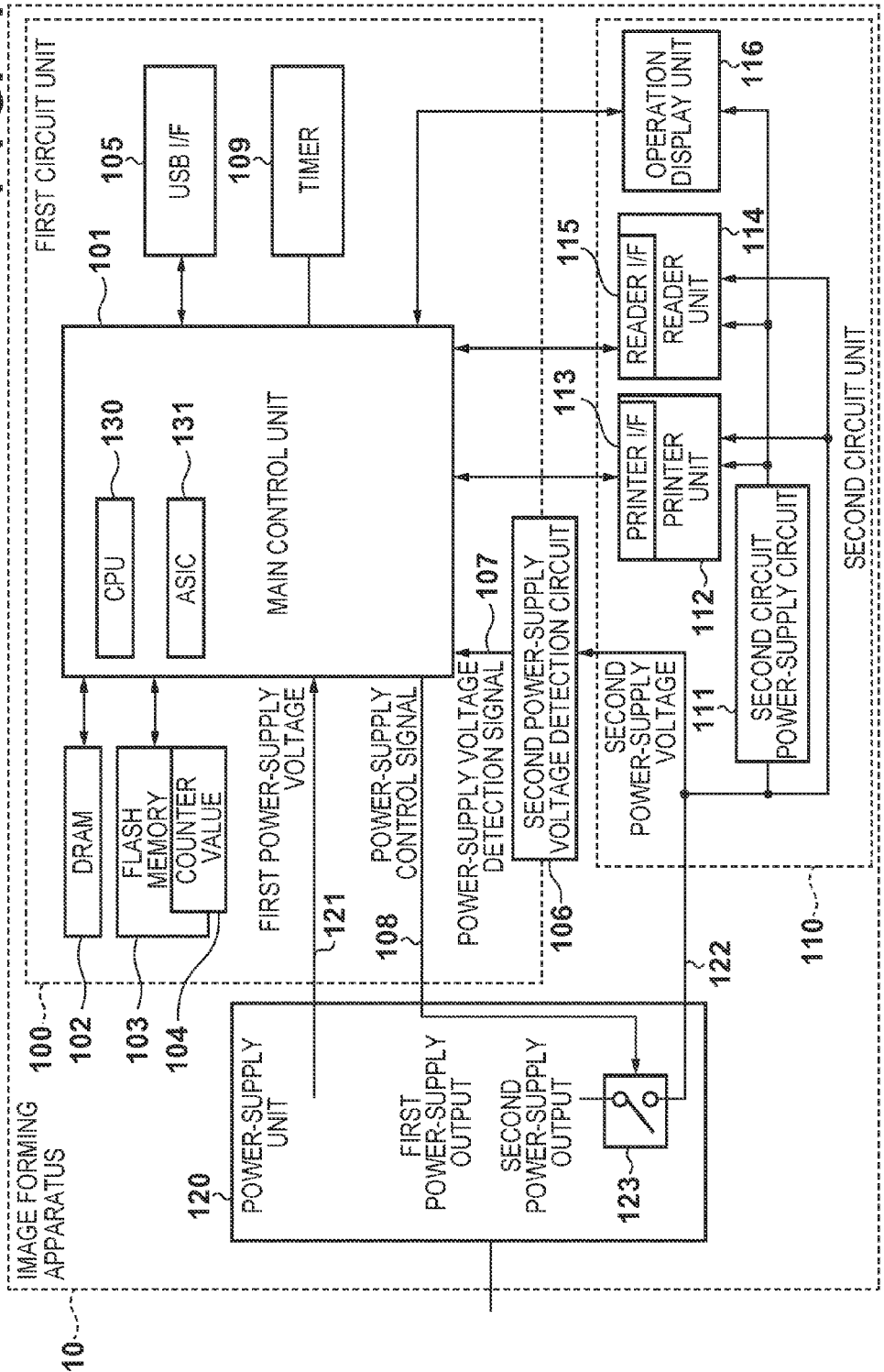
FIG. 1 is a block diagram for showing a hardware configuration of an image forming apparatus according to a first embodiment of the present invention.

FIG. 1 is a block diagram for showing a hardware configuration of an image forming apparatus 10 according to a first embodiment of the present invention.

The image forming apparatus 10 comprises a CPU, a memory, and the like, and comprises a first circuit unit 100 for operating at a low-voltage, a second circuit unit 110 having a motor, or the like, and operating at a comparably high power-supply voltage, and a power-supply unit 120 for supplying electric power to these. Here, the first circuit unit 100 operates by receiving a power-supply by a first power-supply voltage 121 output from the power-supply unit 120. Also, the second circuit unit 110 operates by a second power-supply voltage 122 output from the power-supply unit 120 and power-supply voltage generated from the second power-supply voltage 122. Here, the first power-supply voltage 121 is 3V, 5V, or the like, for example, and the second power-supply voltage 122 is 24V, 38V or the like, for example.

The first circuit unit 100 comprises a main control unit 101, a DRAM 102, a flash memory 103, a USB I/F (interface) 105, and a second power-supply voltage detection circuit 106, and outputs a power-supply control signal 108 for turning on/off a power-supply switch 123. The main control unit 101 controls the image forming apparatus 10 on the whole. Note, the main control unit 101 comprises a CPU 130 and an ASIC 131. The DRAM 102 stores control programs executed by the CPU 130, image data, and the like. The flash memory 103 stores parameters specific to the image forming apparatus 10, or a compression program, apparatus type information, settings, and the like, of the image forming apparatus 10. A counter value 104 is a value counting the number of times a state, in which a power-supply voltage detection signal 107 indicates that the second power-supply voltage 122 is reduced or is normal, is entered, as will be explained later. When the counter value 104 becomes greater than or equal to predetermined values (thresholds), the main control unit 101 determines that the second power-supply voltage 122 is reduced or the second power-supply voltage 122 became normal. In the embodiment, the thresholds are set to differing values respectively in accordance with whether a state indicates that the second power-supply voltage 122 is reduced or is normal.

The USB I/F 105 connects to a PC (not shown), receives print data from the PC, and transfers read image data to the PC. The second power-supply voltage detection circuit 106 inputs a second power-supply voltage 122, and when the second power-supply voltage 122 decreases below a predetermined voltage, the main control unit 101 is notified by setting the power-supply voltage detection signal 107 to a high-level. In the first embodiment, when the power-supply voltage detection signal 107 is a high-level, it indicates that the second power-supply voltage 122 is reduced, and in a case where it is at a low-level, it indicates that the second power-supply voltage 122 is at a normal voltage. The power-supply control signal 108 is output to the power-supply unit 120 from the main control unit 101, and is a signal for turning on/off an output of the second power-supply voltage 122 by turning on/off the power-supply switch 123 of the power-supply unit 120. A timer 109, is a programmable timer, and generates an interrupt to the CPU 130 every time period set by the CPU 130. The above described counter value 104 stores a counter value in which these interrupts are counted.

The second circuit unit 110 comprises a second circuit power-supply circuit 111, a printer unit 112, a reader unit 114, and an operation display unit (operation unit) 116, and the second circuit unit 110 operates by receiving a power-supply by the second power-supply voltage 122. Therefore, the second circuit unit 110, in the power conservation mode, does not operate because the power-supply switch 123 is turned off by the power-supply control signal 108 from the main control unit 101, and the second power-supply voltage 122 from the power-supply unit 120 is not supplied. The second circuit power-supply circuit 111 inputs the second power-supply voltage 122, and generates voltage less than that from second power-supply voltage 122, and supplies this to the printer unit 112, the reader unit 114, and an operation display unit 116.

The printer unit 112 receives image data stored in the DRAM 102 from the main control unit 101 via a printer I/F 113 that is internal, and prints an image. The reader unit 114 is controlled from the main control unit 101 via an internal reader I/F 115, reads originals, generates image data of the originals, and outputs to the main control unit 101. The operation display unit 116 outputs user operation input to the main control unit 101, and displays messages, and the like, to the user according to instructions from the main control unit 101.

The second power-supply voltage 122, which is supplied to the second circuit unit 110 is supplied in order to drive a mechanism such as a motor of the printer unit 112 or the reader unit 114. Also, in order to detect a voltage value of the second power-supply voltage 122, the second power-supply voltage 122 is input into the second power-supply voltage detection circuit 106. Furthermore, the second power-supply voltage 122 is input into the second circuit power-supply circuit 111 for outputting a voltage other than the second power-supply voltage 122 used in the second circuit unit 110.

The power-supply unit 120 is a power-supply for outputting the first power-supply voltage 121 and the second power-supply voltage 122. The power-supply switch 123 is a switch for turning on/off an output of the second power-supply voltage 122, and on/off of the power-supply switch 123 is controlled by the power-supply control signal 108 from the main control unit 101.

The main control unit 101 of the image forming apparatus 10 stops the power-supply to the second circuit unit 110 by turning off the power-supply switch 123 with the power-supply control signal 108 when the apparatus transitions into the power conservation state. Also, when it is detected that the second power-supply voltage 122 is reduced to less than or equal to a predetermined voltage when not in the power conservation state, the second power-supply voltage 122 is determined to be reduced when a time period over which the state in which the second power-supply voltage 122 is reduced continues for greater than or equal to a predetermined time. Conversely, when it is detected that the second power-supply voltage 122 is greater than or equal to a predetermined voltage, and has returned to the normal voltage, when the time period that the state in which the second power-supply voltage 122 is the normal voltage continues for greater than or equal to a predetermined time, it is determined that the second power-supply voltage 122 returned to the normal voltage.

Figure 2:
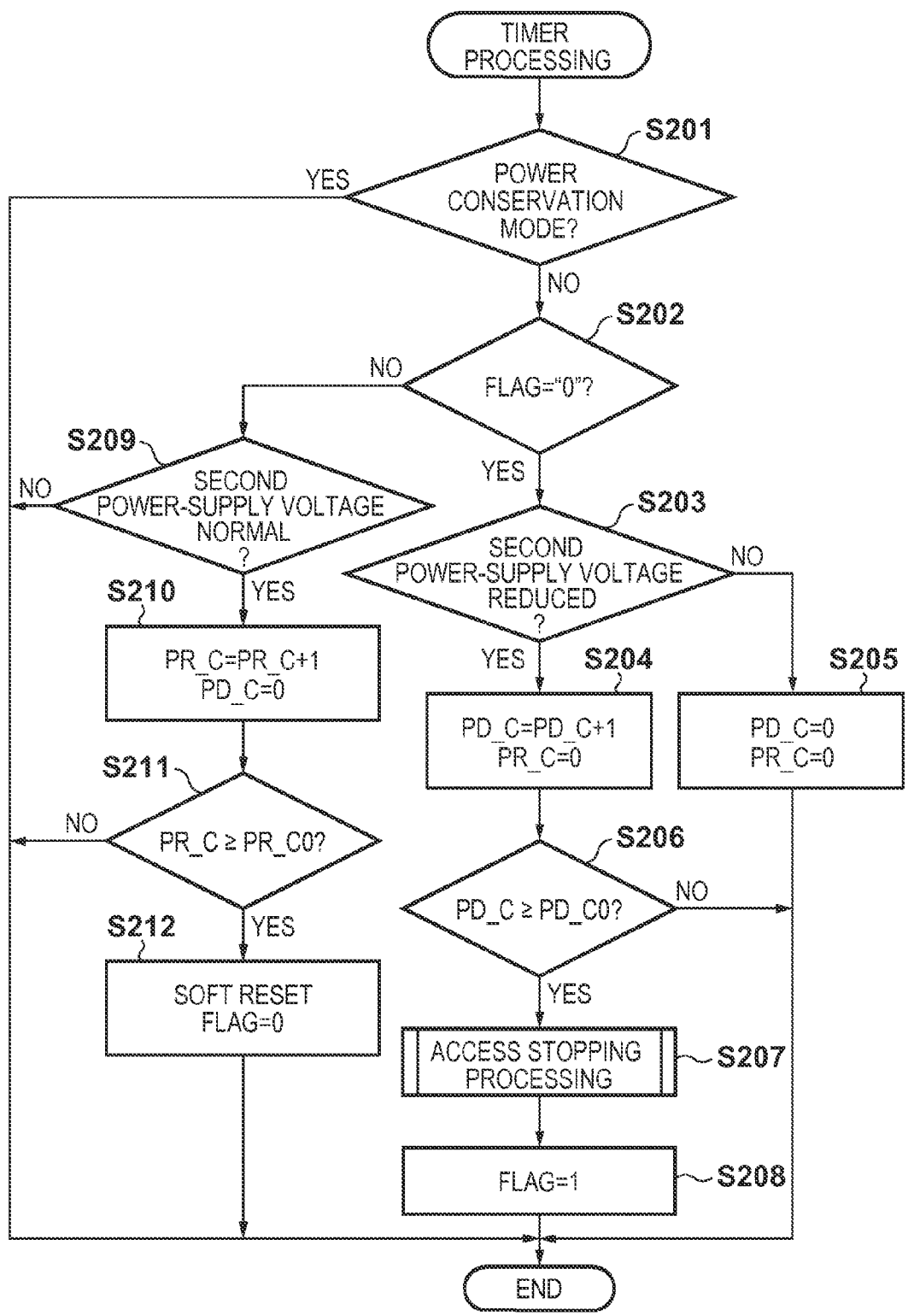
FIG. 2 is a flowchart for describing an operation of the image forming apparatus according to the first embodiment.

FIG. 2 is a flowchart for describing an operation of the image forming apparatus 10 according to the first embodiment. This processing is realized by the CPU 130 of the main control unit 101 executing a program loaded into the DRAM 102 from the flash memory 103.

This processing is initiated by an interrupt signal to the CPU 130 generated at predetermined intervals by the timer 109. Here, the CPU 130 detects the power-supply voltage detection signal 107 output from the second power-supply voltage detection circuit 106 and executes the processing. Note, in the first embodiment, a flag indicates that the printer unit 112, the reader unit 114 and the operation display unit 116 of the second circuit unit 110 are reset by the reduction of the second power-supply voltage 122 and operation thereof is caused to stop. This flag is stored in the DRAM 102 or the flash memory 103, and the flag being "1" indicates that the second power-supply voltage 122 is reduced and each unit of the second circuit unit 110 is reset, and operation thereof is caused to stop. This processing will be explained later with reference to FIG. 3.

Also, PD_C is a counter value (elapsed time) counting interrupts by the timer 109 from the time when the reduction of the second power-supply voltage 122 is detected and indicates the time period over which the reduction of the second power-supply voltage 122 continues. Also, PR_C is a counter value (elapsed time) counting timer interrupts from the time when it is detected that the second power-supply voltage 122 is normal, and indicates the time period that the state in which the second power-supply voltage 122 is normal continues. Also, PD_C0 is an elapsed time threshold for determining that the second power-supply voltage 122 is reduced, and the second power-supply voltage 122 is determined to be reduced when PD_C becomes greater than or equal to PD_C0. Furthermore, PR_C0 is an elapsed time threshold for determining that the second power-supply voltage 122 became normal, and the second power-supply voltage 122 is determined to have become normal when PR_C becomes greater than or equal to PR_C0.

Firstly, in step S201, the CPU 130 determines whether or not that current state is the power conservation state, and if it is the power conservation state, the CPU 130 completes the processing. This is because in the power conservation state, it is not necessary to determine whether or not the second power-supply voltage 122 is normal. When it is determined that the power conservation state is not transitioned into in step S201, the processing proceeds to step S202, and the CPU 130 checks the previously described flag, and determines whether or not each unit of the second circuit unit 110 is reset. Here, when it is determined that the flag is "0", i.e. each unit of the second circuit unit 110 is not reset, the processing proceeds to step S203, and the CPU 130 examines the state of the power-supply voltage detection signal 107. In step S203, when the CPU 130 determines that the power-supply voltage detection signal 107 is at a low-level, i.e. the second power-supply voltage 122 is normal, the processing proceeds to step S205, PD_C and PR_C are both set to "0", and the counter value 104 is cleared. In such a case, the CPU 130, after clearing the counter value 104 in step S205, waits for the next timer interrupt.

Meanwhile, when it is determined that the power-supply voltage detection signal 107 is at a high-level and the second power-supply voltage 122 is reduced in step S203, the processing proceeds to step S204, and the CPU 130 increments (+1) the count of PD_C, and sets PR_C to "0". Then, the processing proceeds to step S206, and the CPU 130 determines whether or not PD_C is greater than or equal to PD_C0, i.e. if the time period for which the second power-supply voltage 122 is continuously reduced is smaller than PD_C0, the processing is terminated, and the next timer interrupt is awaited. On the other hand, when the CPU 130, in step S206, determines that PD_C is greater than or equal to PD_C0, i.e. the time period over which the second power-supply voltage 122 is continuously reduced is larger than or equal to PD_C0, it is determined that the second power-supply voltage 122 is reduced below the predetermined voltage. In this case, the processing proceeds to step S207, the CPU 130 performs the second circuit unit 110 access stopping processing which will be explained later with reference to FIG. 3, and the processing proceeds to step S208. In step S208, the CPU 130 sets the flag indicating that the access stopping processing is performed to "1", and the processing completes.

In this way, when the main control unit 101 detects that the second power-supply voltage 122 is reduced to less than or equal to a predetermined voltage, the printer unit 112, the reader unit 114, or the like, of the second circuit unit 110 is reset, and operation thereof can be stopped.

Meanwhile, in step S202, the CPU 130 determines that the flag is "1", i.e. in step S207 the second circuit unit 110 access stopping processing is performed, the processing proceeds to step S209, and the CPU 130 verifies the power-supply voltage detection signal 107. Here, because when the power-supply voltage detection signal 107 is at the high-level, i.e. when the second power-supply voltage 122 is reduced, it indicates that the second power-supply voltage 122 is reduced after the access stopping processing, the process is terminated as is.

On the other hand, when in step S209 the power-supply voltage detection signal 107 is at the low-level, i.e. the second power-supply voltage 122 is a normal voltage value, the processing proceeds to step S210. In step S210, the CPU 130 increments (+1) the counter value PR_C from when the second power-supply voltage 122 is detected to be normal, and sets PD_C which times the time period of the voltage reduction to "0". Next, the processing proceeds to step S211, and the CPU 130 determines whether or not PR_C is greater than or equal to PR_C0, i.e. when it is determined that the time period, over which the second power-supply voltage 122 is continuously the normal voltage, is larger than or equal to PR_C0, it is determined that the second power-supply voltage 122 has become the normal voltage. Then, the processing proceeds to step S212, and the CPU 130, because the second power-supply voltage 122 is normal, sets the flag to "0" and executes reset processing with software, and the processing completes.

In this way when the main control unit 101 detects that the second power-supply voltage 122 returns to the predetermined voltage (the normal voltage), reset processing is executed by software, and a state in which access to the second circuit unit 110 is possible is entered.

Figure 3:
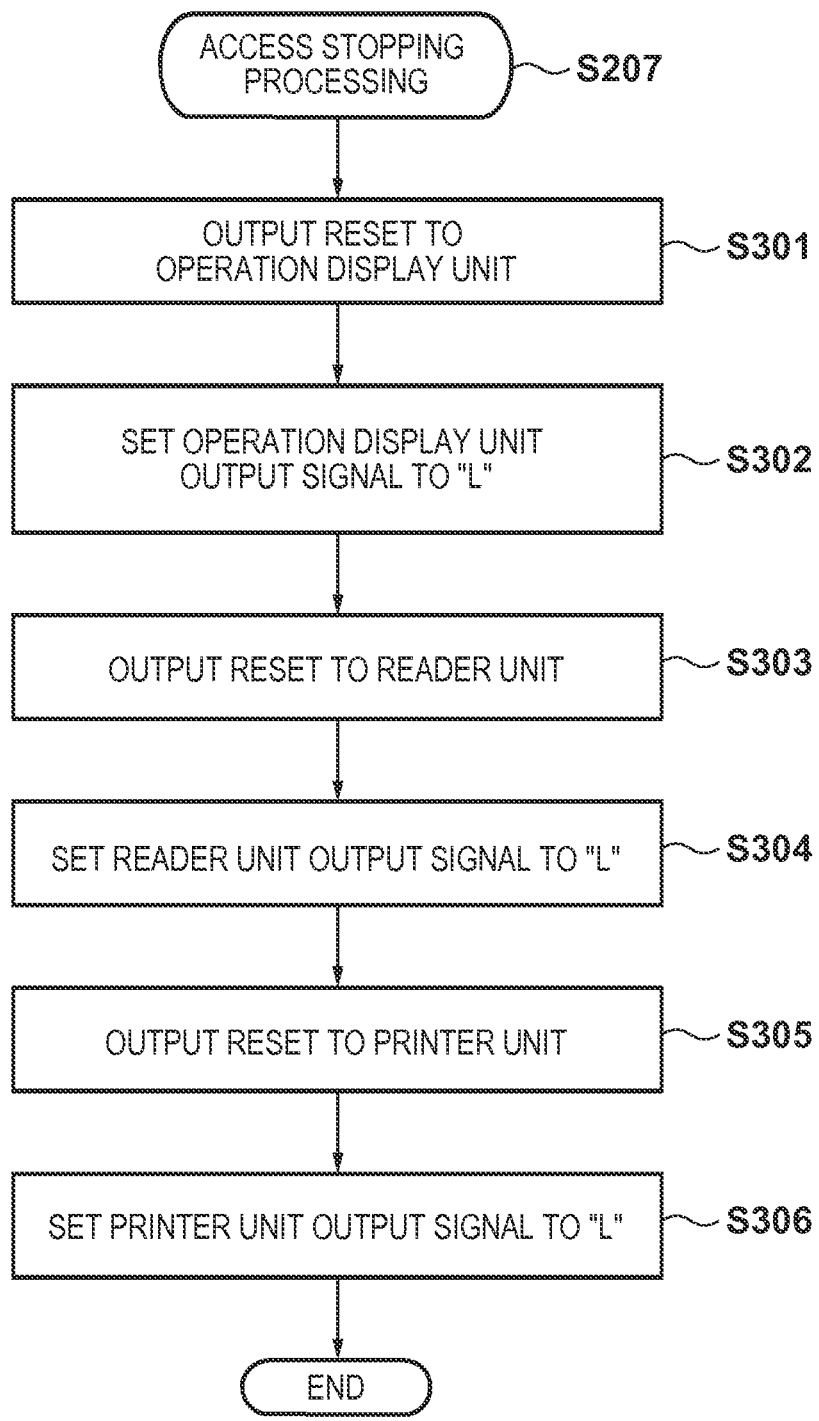
FIG. 3 is a flowchart for describing processing for stopping access to a second circuit unit that a main control unit of the image forming apparatus performs according to the first embodiment.

FIG. 3 is a flowchart for describing processing for stopping access to the second circuit unit 110 that a main control unit 101 of the image forming apparatus 10 performs according to the first embodiment. This processing is realized by the CPU 130 of the main control unit 101 executing a program loaded into the DRAM 102 from the flash memory 103.

Here, in a case where the second power-supply voltage 122 reduced below a predetermined voltage, the main control unit 101 determines that the power-supply switch 123 is turned off, and the second power-supply voltage 122 is transitioned into a powered off state, and access to the second circuit unit 110 is stopped in advance.

Here, first, in step S301, the CPU 130 outputs a reset signal to the operation display unit 116. Next, the processing proceeds to step S302, and the CPU 130 sets the output signal to the operation display unit 116 to the low-level. Next, the processing proceeds to step S303, and the CPU 130 outputs the reset signal to the reader unit 114 via the reader I/F 115. Next, in step S304, the CPU 130 sets the output signal to the reader unit 114 to the low-level. In addition, the processing proceeds to step S305, and the CPU 130 outputs the reset signal to the printer unit 112. Next, the processing proceeds to step S306, and the CPU 130 sets the output signal to the printer unit 112 to the low-level.

By the above processing, the main control unit 101 resets the printer unit 112, the reader unit 114, and the operation display unit 116 of the second circuit unit 110, and makes it so that access is not accepted by disabling these.

Figure 4:
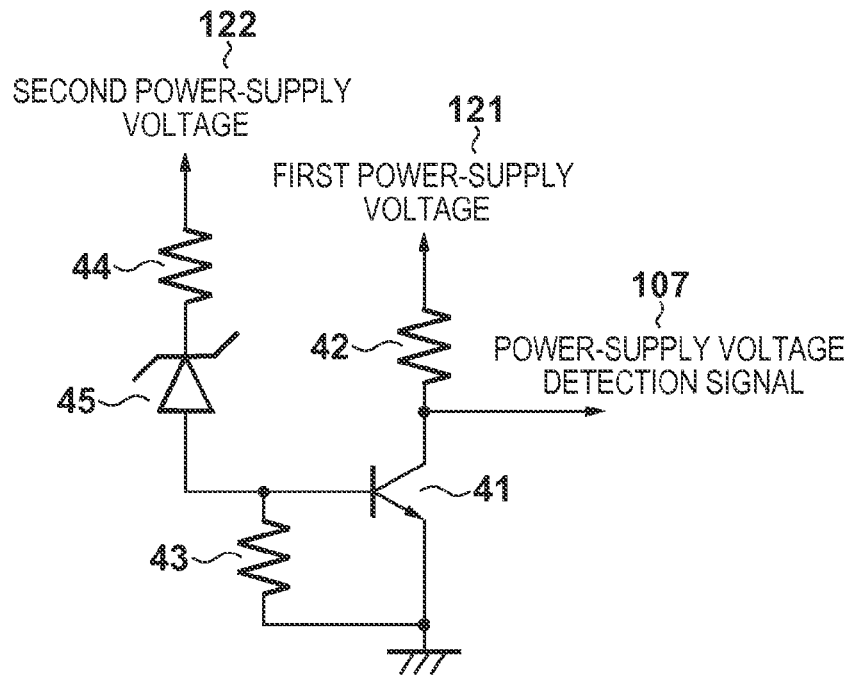
FIG. 4 is a circuit diagram indicating an example of a second power-supply voltage detection circuit according to the first embodiment.

FIG. 4 is a circuit diagram for showing and example of the second power-supply voltage detection circuit 106 according to the first embodiment.

A transistor 41 is an NPN transistor, and when the second power-supply voltage 122 is reduced, it becomes OFF, and the power-supply voltage detection signal 107 is made to be the high-level. A resistor 42 is a collector of the transistor 41, and is a pull-up resister connected to the first power-supply voltage 121. A resistor 43 is a resistor connected to a base of the transistor 41. A current-limiting resistor 44 is connected to the second power-supply voltage 122. Note, in a case where the second power-supply voltage 122 is the normal voltage value, the resistor 43 is set to a resistance value for which it is sufficiently possible to turn ON the transistor 41. A zener voltage of a zener diode 45 is a voltage less than the second power-supply voltage 122, and the zener diode 45 is connected between the resistor 44 and the resistor 43.

Next explanation will be given for operation of this electric circuit. In a case where the second power-supply voltage 122 is a normal value, voltage from the second power-supply voltage 122 which is sufficient to cause the transistor 41 to turn ON, and which is larger than the zener voltage of the zener diode 45, is applied to the base of the transistor 41. Accordingly, in such a case, the transistor 41 is turned ON, and the power-supply voltage detection signal 107 becomes the low-level.

Next, when the second power-supply voltage 122 is reduced to less than or equal to the zener voltage of the zener diode 45, the voltage ceases to be applied to the resistor 43, and the base of the transistor 41, and the transistor 41 becomes OFF. In such a case, the power-supply voltage detection signal 107 becomes the high-level.

In this way, when the second power-supply voltage 122 reduces to less than or equal to a predetermined voltage (here, the zener voltage), the transistor 41 becomes off, the power-supply voltage detection signal 107 becomes the high-level, and the power-supply voltage detection signal 107 indicating that the second power-supply voltage 122 is reduced is output. With this, the second power-supply voltage detection circuit 106 is able to detect reduction of the second power-supply voltage 122 and a return (voltage fluctuation) to the normal voltage.

Figure 5:
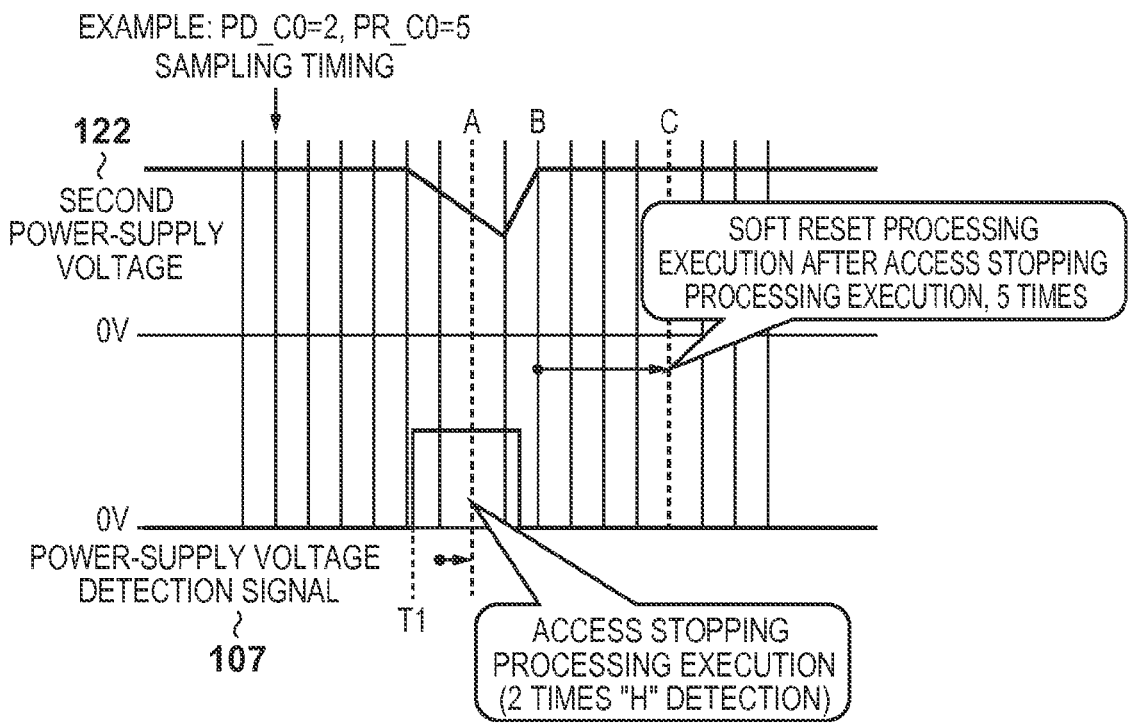
FIG. 5 is a timing chart for explaining processing for determining that the second power-supply voltage is reduced and that the second power-supply voltage is normal, according to the first embodiment

FIG. 5 is a timing chart for explaining processing for determining that the second power-supply voltage 122 is reduced, and for determining that the second power-supply voltage 122 is normal, according to the first embodiment. Here, a case in which hypothetically PD_C0=2, and PR_C0=5 is shown.

When, the second power-supply voltage 122 is reduced to less than an original voltage, the power-supply voltage detection signal 107 output by the second power-supply voltage detection circuit 106 at a timing T1 becomes the high-level. In FIG. 5, a plurality of vertical lines indicate the timings of interrupts by the timer 109, and the main control unit 101 initiates timing of the time period over which the power-supply voltage detection signal 107 is at the high-level at the timing T1. In such a case, because PD_C0=2, at the point in time A, when the counter value 104 becomes "2", it can be confirmed that the power-supply voltage detection signal 107 is at the high-level. Then, at this point in time, the flowchart of FIG. 3 is executed, and the second circuit unit 110 access stopping processing is executed.

After that, when the second power-supply voltage 122 returns to the normal voltage value (point B), the power-supply voltage detection signal 107 output by the second power-supply voltage detection circuit 106 becomes the low-level. When the main control unit 101 detects this, counting of the time period over which the low-level continues is initiated. Then, after that, when the time period at which the power-supply voltage detection signal 107 continuously is the low-level exceeds PR_C0=5, the main control unit 101 initializes the image forming apparatus 10 by executing (point C) a soft-reset.

As explained above, by virtue of the first embodiment, there is the effect that it is possible to detect accurately, and to handle the power-supply voltage supplied to the second circuit unit 110 being reduced, and the power-supply voltage supplied to the second circuit unit 110 returning to the normal voltage. Here, the time period measured is a time period based on the number of times of an interrupt by a timer.

So, it is possible to detect accurately a reduction of the power-supply voltage supplied to the second circuit unit 110 including a printer unit, a reader unit, and an operation display unit, and to perform reset processing on the printer unit, the reader unit, and the operation display unit. Also, when the power-supply voltage returns to the normal value, it is possible that the image forming apparatus 10 be initialized and the following operation be provided.

Second Embodiment

Next explanation will be given for a second embodiment of the present invention. Note, a hardware configuration of the image forming apparatus 10 according to the second embodiment is the same as that of the previously described first embodiment, and so explanation is omitted.

Figure 6:
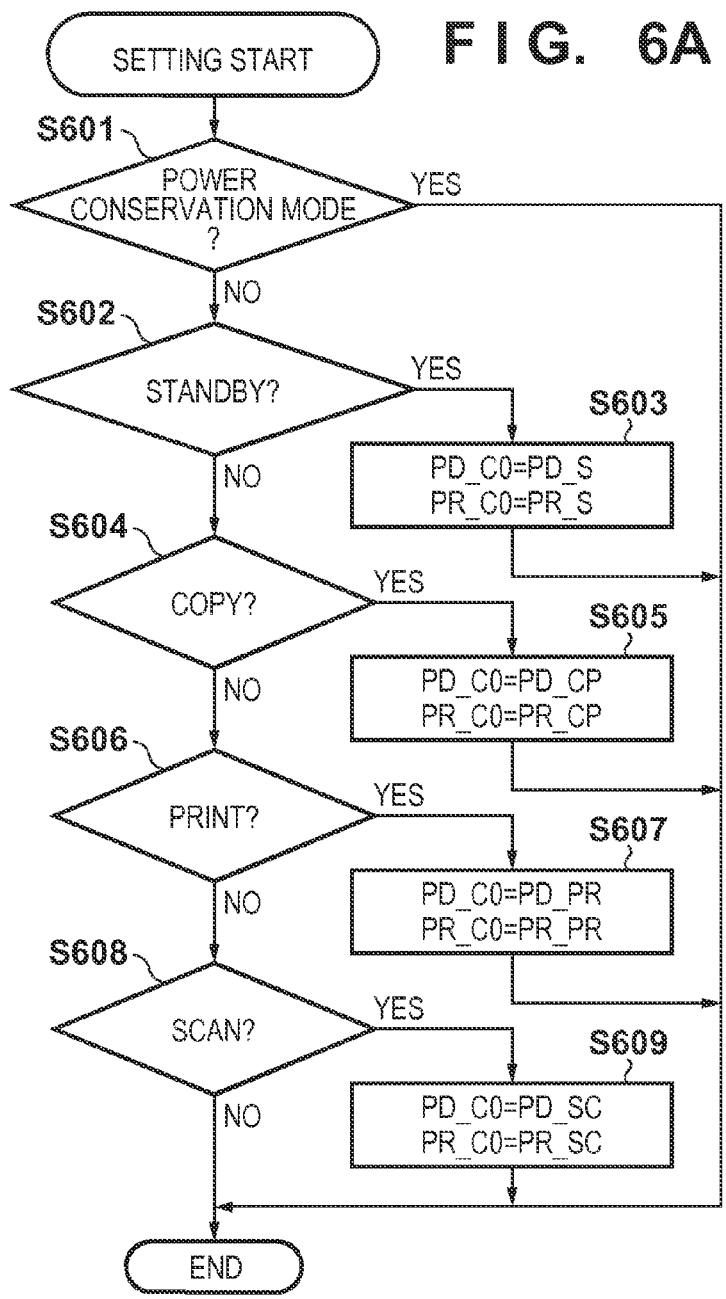
FIG. 6A is a flowchart for describing an operation of an image forming apparatus according to the second embodiment.
FIG. 6B is a view for illustrating an example of a table of threshold values PD_C0 and PR_C0 set in each operation mode in a second embodiment.

FIG. 6A is a flowchart for describing an operation of the image forming apparatus 10 according to the second embodiment. This processing is realized by the CPU 130 of the main control unit 101 executing a program loaded into the DRAM 102 from the flash memory 103.

FIG. 6B is a view for illustrating an example of a table of thresholds PD_C0, and PR_C0 set for each operation mode. This table is stored in the flash memory 103, and optimal thresholds are stored for each operation. The main control unit 101 references this table upon an operation mode change. For this reason, a point of difference with the previously described first embodiment is that the setting of PD_C0 and PR_C0 is changed in accordance with the operation mode, and an optimal instantaneous interruption time of the second power-supply voltage 122 being set in accordance with each operation mode is different. Only this initial setting is different, and after this, the operation in accordance with the flowchart of FIG. 2, which the same as in the first embodiment, is assumed.

The main control unit 101 executes the processing shown in the flowchart of FIG. 6A every time the operation mode of the image forming apparatus 10 changes, and, using an optimal threshold for the operation mode, detects a voltage reduction of the second power-supply voltage 122, and detects that it becomes the normal voltage.

Firstly, in step S601, the CPU 130 determines whether or not transition is made into the power conservation state, and when transition is made into the power conservation state, the processing completes as is. When, in step S601, the CPU 130 determines that the power conservation state is not transitioned into, the processing proceeds to step S602, and the CPU 130 determines whether or not the image forming apparatus 10 is in the standby state. If it is, the processing proceeds to step S603, and the CPU 130 with reference to the table of FIG. 6B sets PD_C0 to PD_S and PR_C0 to PR_S, and the processing completes. For example, because here it is the standby state, PD_S and PR_S are both set to values less than the defaults PD_C0 and PR_C0.

In step S602, when it is not the standby state, the processing proceeds to step S604, and the CPU 130 determines whether or not it is a copy mode. If it is the copy mode, the processing proceeds to step S605 and the CPU 130, with reference to the table of FIG. 6B, sets PD_C0 to PD_CP and PR_C0 to PR_CP, and the processing completes. For example, in the copy mode, because the printer unit 112 and the reader unit 114 both operate, fluctuation of the second power-supply voltage 122 is expected. Accordingly, PD_CP and PR_CP are set to values larger than the defaults PD_C0 and PR_C0.

In step S604, when it is not the copy mode, the processing proceeds to step S606, and the CPU 130 determines whether or not it is a print mode. If it is the print mode, the processing proceeds to step S607, and the CPU 130, with reference to the table of FIG. 6B, sets PD_C0 to PD_PR and PR_C0 to PR_PR, and the processing completes. For example, in the print mode, because only the printer unit 112 operates, it is expected that for the second power-supply voltage 122 there will be somewhat more fluctuation than in the standby state, but the fluctuation amount will be smaller than in the copy mode. Accordingly, PD_PR and PR_PR are set to values larger than the defaults PD_C0 and PR_C0, and smaller than PD_CP and PR_CP.

Also, in step S606, when it is not the print mode, the processing proceeds to step S608, and the CPU 130 determines whether or not it is a scan mode. If it is the scan mode, the processing proceeds to step S609, and the CPU 130, with reference to the table of FIG. 6B, sets PD_C0 to PD_SC and PR_C0 to PR_SC, and the processing completes. For example, in the scan mode, because only the reader unit 114 operates, it is expected that for the second power-supply voltage 122 there will be somewhat more fluctuation than in the standby state, but the fluctuation amount will be smaller than in the print mode. Accordingly, PD_SC and PR_SC are set to values larger than the defaults PD_C0 and PR_C0, and smaller than PD_PR and PR_PR.

Note, in other modes, because the main control unit 101 does not perform setting changes for PD_C0 and PR_C0, the default values of PD_C0 and PR_C0 are used.

As explained above, by the second embodiment, thresholds for a time period over which a reduction of the second power-supply voltage 122 is detected, and a time period over which it is detected that the second power-supply voltage 122 returns to the normal value are changed in accordance with the operation mode of the image forming apparatus. With this, there is the effect that accurate detection can be made of a fluctuation of the second power-supply voltage in accordance with each operation mode.

Third Embodiment

Next, explanation will be given for a third embodiment of the present invention. Note, a hardware configuration of the image forming apparatus 10 according to the third embodiment is the same as that of the previously described first embodiment, and so explanation is omitted.

Figure 7:
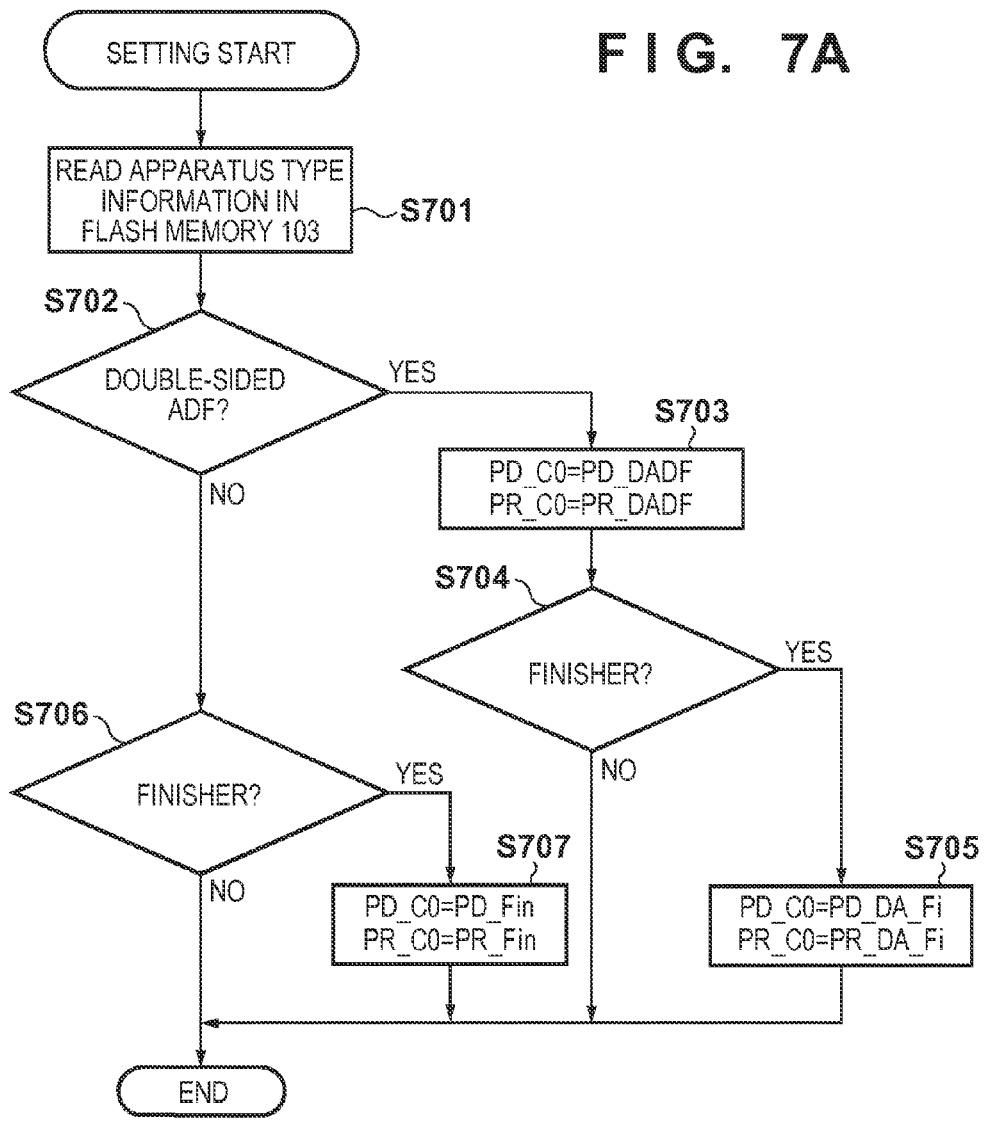
FIG. 7A is a flowchart for describing an operation of the image forming apparatus according to a third embodiment.
FIG. 7B is a view for illustrating an example of a table of threshold values PD_C0 and PR_C0 set in accordance with a setting of an option in the third embodiment.

FIG. 7A is a flowchart for describing an operation of the image forming apparatus 10 according to the third embodiment. This processing is realized by the CPU 130 of the main control unit 101 executing a program loaded into the DRAM 102 from the flash memory 103.

FIG. 7B is a view for illustrating an example of a table of thresholds PD_C0, and PR_C0 set for each option. This table is stored in the flash memory 103, and optimal thresholds are stored upon mounting of each option.

The processing of FIG. 7A is initiated by the power-supply of the apparatus being turned on, and firstly, in step S701, the CPU 130 reads out apparatus type information in the flash memory 103 and determines what kind of options are set. Next, in step S702, the CPU 130, based on the apparatus type information, determines whether or not a double-sided ADF is set as an option. When a double-sided ADF is mounted, the processing proceeds to step S703 and the CPU 130, with reference to the table of FIG. 7B, sets PD_C0 to PD_DADF and PR_C0 to PR_DADF. Next, the processing proceeds to step S704, and the CPU 130 determines whether or not a finisher is mounted. Here, when it is determined that that the finisher is mounted, the processing proceeds to step S705, the CPU 130 sets PD_C0 to PD_DA_Fi, and PR_C0 to PR_DA_Fi, and the processing completes.

On the other hand, when, in step S704, the CPU 130 determines that the finisher is not mounted, PD_C0 is set to PD_DADF and PR_C0 to PR_DADF, and the processing completes. Also, in step S702, when it is determined that there is no double-sided ADF, the processing proceeds to step S706, and the CPU 130 determines whether or not a finisher is mounted. Here, when it is determined that a finisher is not mounted, with the setting of the defaults of PD_C0 and PR_C0, the processing completes. Also, in step S706, when the CPU 130 determines that a finisher is mounted, the processing proceeds to step S707, and the CPU 130, with reference to the settings of the finisher of FIG. 7B, sets PD_C0 to PD_Fin and PR_C0 to PR_Fin, and the processing completes.

As explained above, by the third embodiment, thresholds for a time period over which a reduction of the second power-supply voltage 122 is detected, and a time period over which it is detected that the second power-supply voltage 122 returns to the normal value are changed in accordance with option settings of the image forming apparatus. With this, there is the effect that accurate detection can be made of a fluctuation of the second power-supply voltage 122 in accordance with each option setting.

Fourth Embodiment

Figure 8:
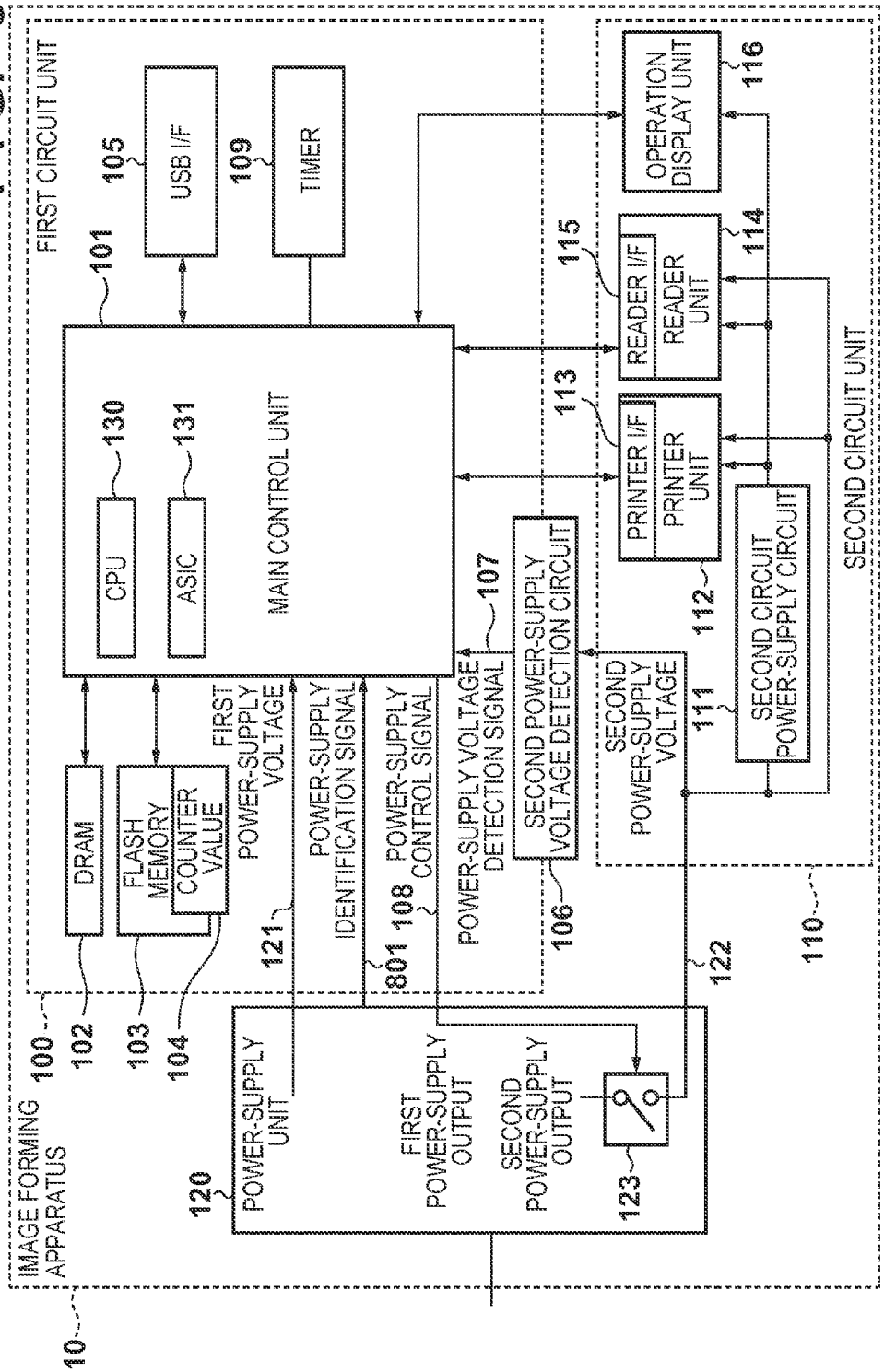
FIG. 8 is a block diagram for showing a configuration of an image forming apparatus according to a fourth embodiment of the present invention.

FIG. 8 is a block diagram for showing a configuration of the image forming apparatus 10 according to the fourth embodiment of the present invention. Note, in FIG. 8, portions common to the configuration of FIG. 1 according to the previously described first embodiment are shown with the same reference numerals, and their explanation will be omitted.

In FIG. 8, the point that a power-supply identification signal 801 is supplied from the power-supply unit 120 to the main control unit 101 is different to the previously described FIG. 1.

Figures 9A, 9B:
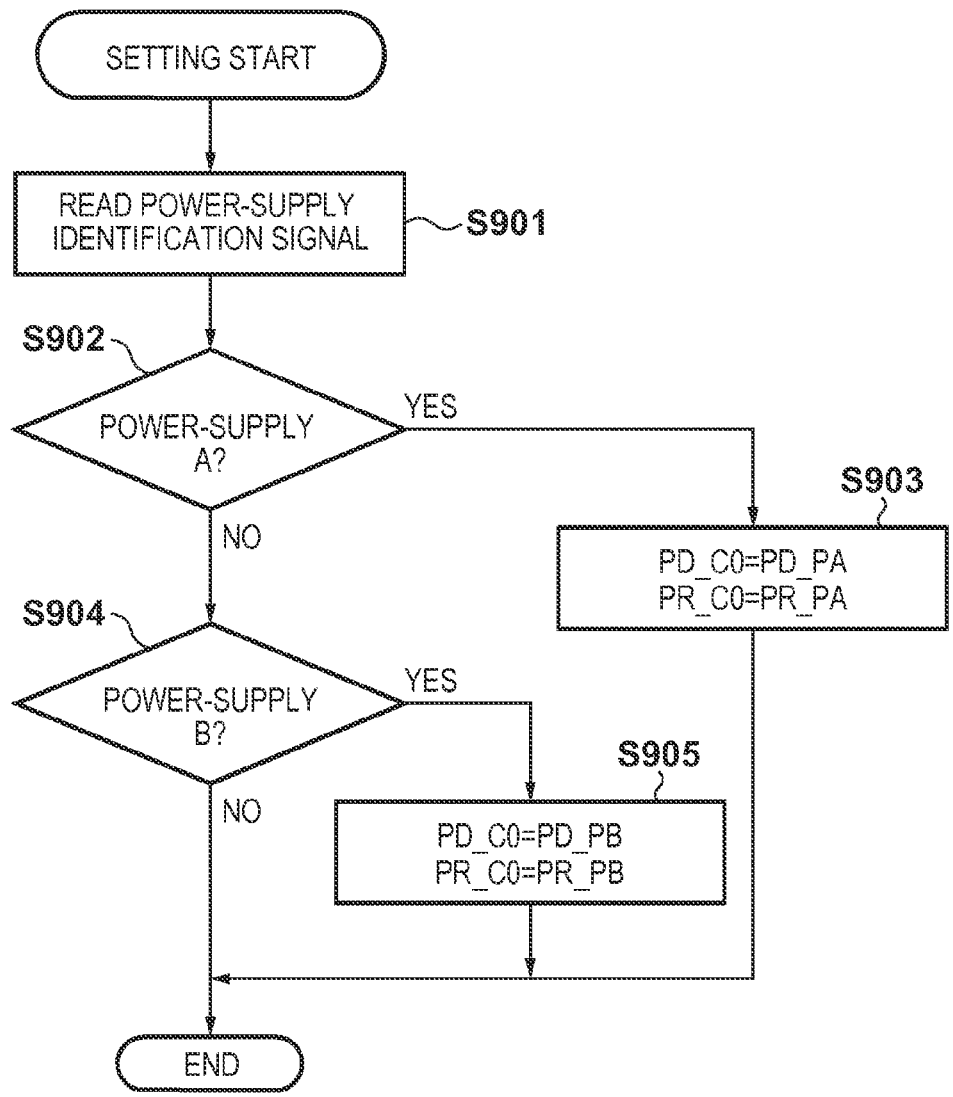
FIG. 9A is a flowchart for describing an operation of the image forming apparatus according to the fourth embodiment.
FIG. 9B is a view for illustrating an example of a table of threshold values PD_C0 and PR_C0 set in accordance with a type of the power-supply unit.

FIG. 9A is a flowchart for describing an operation of the image forming apparatus 10 according to the fourth embodiment. This processing is realized by the CPU 130 of the main control unit 101 executing a program loaded into the DRAM 102 from the flash memory 103.

FIG. 9B is a view for illustrating an example of a table of thresholds of PD_C0 and PR_C0 set in accordance with the type of the power-supply unit 120. This table is stored in the flash memory 103, and optimal thresholds are stored in accordance with the type of the power-supply unit 120.

The processing shown in FIG. 9A is initiated by the power-supply of the image forming apparatus 10 being turned on. Firstly, in step S901, the CPU 130 reads a power-supply identification signal 801 output from the power-supply unit 120, and distinguishes the type of the power-supply unit 120. Next, the processing proceeds to step S902, and the CPU 130 determines whether or not the power-supply identification signal 801 indicates a power-supply A. If it does, the processing proceeds to step S903, and the CPU 130 with reference to the table of FIG. 9B sets PD_C0 to PD_PA and PR_C0 to PR_PA, and the processing completes.

On the other hand, when it is determined that it is not the power-supply A in step S902, the processing proceeds to step S904, and the CPU 130 determines whether or not the power-supply identification signal 801 indicates a power-supply B. If it does, the processing proceeds to step S905, and the CPU 130 with reference to the table of FIG. 9B sets PD_C0 to PD_PB and PR_C0 to PR_PB, and the processing completes.

As explained above, by the fourth embodiment, thresholds for a time period over which a reduction of the second power-supply voltage 122 is detected, and a time period over which it is detected that the second power-supply voltage 122 returns to the normal value are changed in accordance with the type of the power-supply unit of the image forming apparatus. With this, there is the effect that accurate detection can be made of a fluctuation of the second power-supply voltage in accordance with the type of the power-supply unit.

Note, in the above described embodiment, for simplicity, explanation was given for an example in which there are two output power-supply voltages, but it goes without saying that the present invention can produce a similar effect in a case where there are more than two.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-162802, filed Aug. 5, 2013, which is hereby incorporated by reference herein in its entirety.

What is claimed is:

1. An image forming apparatus comprising:
a controller which includes one or more processors;
a printer unit;
a printer interface which is able to communicate with the controller and outputs image data to the printer unit;
a power-supply which outputs a first power and a second power of a higher voltage than the first power, the first power being supplied to the controller, and the second power being supplied to the printer unit;
a power converter which converts the second power supplied from the power-supply into a third power of a lower voltage than the second power, the third power being supplied to the printer unit; and
a power monitoring circuit which monitors the second power and outputs a detection signal to the controller based on the second power becoming lower than a predetermined voltage,
wherein the controller outputs a stop signal to the printer interface based on the detection signal from the power monitoring circuit, and wherein the printer interface stops outputting image data to the printer unit based on the stop signal.

2. The image forming apparatus according to claim 1, wherein the stop signal is a reset signal, and the printer interface is reset based on the reset signal.

3. The image forming apparatus according to claim 1, wherein the controller outputs a control signal based on the detection signal, and the power-supply stops supplying the second power based on the control signal.

4. The image forming apparatus according to claim 1, wherein the power monitoring circuit outputs the detection signal to the controller based on a predetermined time period elapsing in a state in which the second power is lower than the predetermined voltage.

5. The image forming apparatus according to claim 4, wherein the predetermined time period is determined in accordance with an operation mode of the image forming apparatus.

6. The image forming apparatus according to claim 4, wherein the predetermined time period is determined in accordance with an option mounted to the image forming apparatus.

7. The image forming apparatus according to claim 4, wherein the predetermined time period is determined in accordance with a type of the power-supply.

8. The image forming apparatus according to claim 1, further comprising:

a scanner unit; and a scanner interface which is able to communicate with the controller and outputs image data received from the scanner unit to the controller, wherein the controller outputs an instruction for stopping driving of the printer unit to the printer interface, based on the notification from the power monitoring circuit.

9. The image forming apparatus according to claim 1, further comprising: a display which displays an image, wherein the controller outputs a stop signal to the display based on the detection signal.

10. A method of controlling an image forming apparatus comprising a controller, a printer unit, and a printer interface which is able to communicate with the controller and outputs image data to the printer unit, the method comprising:

outputting a first power and a second power of a higher voltage than the first power, the first power being supplied to the controller and the second power being supplied to the printer unit;

converting the second power into a third power of a lower voltage than the second power, the third power being supplied to the printer unit;

monitoring the second power;

outputting a detection signal to the controller based on the second power becoming lower than a predetermined voltage; and outputting a stop signal to the printer interface based on the detection signal, wherein the printer interface stops outputting the image data to the printer unit based on the stop signal.

\* \* \* \* \*